(12) United States Patent
Suntup

(10) Patent No.: US 11,328,619 B1
(45) Date of Patent: May 10, 2022

(54) METHOD FOR TRAINING HEATING OIL TANK TRUCK DRIVERS

(71) Applicant: Jeffrey Hale Suntup, New London, CT (US)

(72) Inventor: Jeffrey Hale Suntup, New London, CT (US)

( * ) Notice: Subject to any disclaimer, the term of this patent is extended or adjusted under 35 U.S.C. 154(b) by 490 days.

(21) Appl. No.: 16/138,749

(22) Filed: Sep. 21, 2018

Related U.S. Application Data

(63) Continuation-in-part of application No. 15/264,137, filed on Sep. 13, 2016, and a continuation-in-part of application No. 13/561,041, filed on Jul. 29, 2012, now abandoned.

(51) Int. Cl.
*G09B 19/00* (2006.01)
*B67D 7/04* (2010.01)
*B67D 7/08* (2010.01)
*B67D 7/62* (2010.01)

(52) U.S. Cl.
CPC ............. *G09B 19/003* (2013.01); *B67D 7/04* (2013.01); *B67D 7/08* (2013.01); *B67D 7/62* (2013.01)

(58) Field of Classification Search
CPC ...... F04B 13/00; F04B 23/025; F04B 49/106; F23C 7/008; B67D 7/08; B67D 7/40; B67D 7/62; B67D 7/84; B67D 7/04; B67D 7/044; B67D 7/0442; B67D 7/0476; B67D 7/24; B67D 7/243; B67D 7/845; G09B 19/003
USPC ........ 222/71–73, 538–539, 608–610, 626, 1, 222/231
See application file for complete search history.

(56) References Cited

U.S. PATENT DOCUMENTS

| | | | | |
|---|---|---|---|---|
| 2,784,747 A * | 3/1957 | Sam | ...................... | B60P 3/2215 141/21 |
| 4,187,962 A * | 2/1980 | Henry | ..................... | B65H 75/40 137/355.22 |
| 4,313,168 A * | 1/1982 | Stephens | ............... | G07F 13/025 705/413 |
| 6,375,470 B1 * | 4/2002 | Rohan | ..................... | G09B 5/00 434/219 |
| 6,463,967 B1 * | 10/2002 | Boyle | .................. | B67D 7/3209 141/100 |
| 7,856,998 B2 * | 12/2010 | Bauer | ................... | B60P 3/2245 137/15.16 |
| 7,861,537 B2 * | 1/2011 | Givens | .................... | F02B 63/04 60/626 |
| 10,626,857 B1 * | 4/2020 | Suntup | ..................... | B67D 7/62 |
| 10,875,760 B2 * | 12/2020 | Suntup | ..................... | B67D 7/08 |
| 2001/0026914 A1 * | 10/2001 | Samuels | .................. | G09B 7/02 434/362 |

(Continued)

*Primary Examiner* — Frederick C Nicolas
(74) *Attorney, Agent, or Firm* — C. Nessler

(57) ABSTRACT

A method for training a worker to delivery heating oil to homes and commercial establishments, comprises having the worker drive a first truck rated at no more than 10,000 pounds gross vehicle weight, the truck carrying as cargo a portable assembly comprising a less than 119 gallon capacity heating oil tank, an up to 29 gallons per minute pump, and a meter sub-system. The Preferably, the portable apparatus with an oil-filled tank weighs less than 1,500 pounds. By using the first truck, the worker becomes better situated to seek the license and other qualifications needed to drive a conventional heating oil tank second truck that typically carries 2,000 or more gallons of heating oil, to deliver heating oil to customers.

6 Claims, 3 Drawing Sheets

(56) References Cited

U.S. PATENT DOCUMENTS

2015/0379889 A1* 12/2015 Jones ................... G09B 19/14
  434/62

* cited by examiner

METHOD FOR TRAINING HEATING OIL TANK TRUCK DRIVERS

This application is a continuation-in-part of both application Ser. No. 15/264,137, filed Sep. 13, 2016 and application Ser. No. 13/561,041, filed Jul. 29, 2012, which application claims benefit of provisional patent application No. 61/547,412, filed Oct. 14, 2011.

TECHNICAL FIELD

The present invention relates to methods for training workers to deliver domestic heating oil to customers of fuel oil dealers, and to become qualified to drive conventional heating oil tank trucks which typically carry several thousands of gallons of heating oil.

BACKGROUND

Home heating oil, often referred to as No. 2 fuel oil, became popular for home heating in the U.S. in the 1930's. Its quality and delivery were defined by standards from the National Bureau of Standards, now known as the National Institute of Standards and Technology (an entity of the U.S. Department of Commerce). It is estimated that about 3.1 billion gallons of heating oil were sold in the U.S. in 2016 and that there are over 11,000 home heating oil fuel oil dealers. Dealers and their operations are well-regulated at the state and federal levels.

Homes which are heated by burning oil are common in the northeastern United States. They typically have building code-compliant storage tanks which hold approximately 275 to 330 gallons of heating oil. Heating oil is most often delivered locally to a home or an analogous small commercial establishment by fuel oil dealers using tank trucks which hold about 2,800 to 5,000 gallons of heating oil and have a gross vehicle weight in the range of 32,000 to 60,000 pounds. (Such kinds of trucks, which have permanently attached tanks, are hereafter often referred to as conventional tank trucks or conventional heating oil delivery trucks. An exemplary truck is pictured in FIG. 5.) Since such trucks weigh more than 26,001 pounds, they are required to have air brakes. A new conventional tank truck can today cost from $150,000 to $300,000. Therefore, a dealer has an interest in maximizing the utilization of a truck and the sales dollars per truck. A dealer also has an interest in minimizing the number of times a truck has to return to the dealer site or an oil depot. That means it is desirable to have large truck-tank capacities and quick delivery flow rates.

At a customer site, heating oil is pumped from the tank of the truck through a hose pulled from a reel on the truck. Oil flows through a nozzle at the end of the hose that has been inserted into the fill pipe of the customer storage tank. A typical quantity delivered by a conventional tank truck may be in the 100-300 gallon range. To minimize the time consumed in pumping oil, the pumps of tank trucks typically have high flow rates, for example 40-110 gallons per minute. Conventional heating oil tank trucks have difficulty dispensing and accurately metering small quantities of oil in conformance with NTEP certification standards (discussed below), in context that the pump and metering system are configured for handling large quantities and high flow rates.

Generally, the transfer of ownership from one party to the other, for instance, from a licensed heating oil dealer to a home owner or business owner, is referred to as "custody transfer." The term custody transfer implicates various requirements that mandate meeting industry and legal/regulatory standards. In many states, consumer protection and/or sales tax laws impose standards on the accuracy and recordation of heating oil transfers. As applied to the process of delivering heating oil to a customer, custody transfer means that the heating oil quantity must be metered and recorded accurately, regardless of variables such as flow rate, temperature and viscosity. A printed record, sometimes called a receipt or a ticket, should be produced showing the quantity delivered for the customer's and the dealer's records and to meet government requirements.

The components of a familiar conventional tank truck used for local-delivery include a high flow capacity metering system that implements custody transfer are commonly required to have a Certificate of Conformance pursuant to the National Type Evaluation Program (NTEP certification) of the National Conference on Weights and Measures, Lincoln, Nebr. A Certificate may be issued based on an authorized tester's determination that the system complies with the standards of the United States Department of Commerce, namely, with requirements set forth in National Institute of Standards and Technology "NIST Handbook 44: Specifications, Tolerances, and Other Technical Requirements for Weighing and Measuring Devices." These requirements are hereafter referred to as the "NTEP certification standard." The NTEP certificate number is usually engraved on an approved system which is used in commerce. The metering system of a truck must also pass the accuracy-of-flow standard and other requirements of state regulators. One way of expressing that a system is compliant with laws and regulations applicable to accurate measurement of residential heating oil deliveries is to say that the system is "weights and measures approved."

A mosaic of federal, state, and local laws and regulations must be complied with in owning, storing and operating a typical heating oil tank truck. They include U.S. Federal Hazardous Materials Regulations relating to transport of hazardous and combustible liquids and laws and regulations aimed at protecting the environment, avoiding fire risk, avoiding terrorist attacks, etc. Periodic vehicle checks are mandated; a driver must make an inspection of the truck at the start of the first daily use, tire inflation must be systematically checked, the truck must carry a fire extinguisher, etc. State motor vehicle authorities, federal department of transportation officers, local/state police, and homeland security officials are known to make in-yard and on-the-road inspections. Fire marshals and insurers may impose other requirements. A truck which carries hazardous materials including heating oils is required by federal law to display specific kinds of placards on the front, rear and both sides, indicating the class of material which is being carried. In the common parlance, when one says that a motor vehicle must be "placarded" that communicates that the vehicle must meet certain federal standards which include making the required placard displays.

Home heating oil (HHO) consists of a mixture of petroleum-derived hydrocarbons. HHO is by U.S. law dyed red to enable persons enforcing motor vehicle fuel tax laws to detect illicit use in over-the-road motor vehicles. Tank trucks having more than 119 gallons capacity and transporting HHO must display a specified federal-mandate placard bearing the number NA 1993. HHO, which should meet ASTM standard D396, is distinct from diesel fuel which is not dyed and which is used in internal combustion engines of motor vehicles. Diesel fuel is subject to SAE International standards such as J313. Biodiesel is a fuel oil derived from vegetable and animal fats, and it may comprise a portion of HHO within the ASTM D396 standard.

The driver of a conventional heating oil tank truck must have a commercial driver license (CDL). That requires passing certain background checks, medical tests, and special driving tests. The driver must meet higher performance standards than regular drivers, both while driving a heating oil tank truck and while driving other ordinary vehicles, including personal vehicles. Time "behind the wheel" is regulated. There are random drug tests. In addition, the driver of a conventional heating oil tank truck must have endorsements to his or her CDL license, including those for carrying hazardous materials, for operating a tank truck, and for operating a vehicle equipped with air brakes. Recent anti-terrorism measures require a Transport Worker Identification Card (TWIC) if the tank truck is driven into an oil terminal for a re-fill or onto certain other sites that are deemed important to U.S. homeland security. Large local-delivery heating oil tank trucks tend to have high centers of gravity compared to non-tank trucks, and the contents might surge or slosh around and induce instability; thus special driver diligence is required.

The requirement for a CDL and meeting other government regulations limits the availability of drivers qualified to operate conventional tank trucks. Furthermore, some may find that being a driver for delivery of home heating oil is unattractive because the work may involve dragging a hose over rough and sometimes snowy terrain, long working hours in cold weather, accepting the odor associated with the heating oil, and accepting a certain seasonality to the employment.

There are practical problems for both the prospective driver and the fuel oil dealer insofar as achieving a mutually satisfactory employment situation. An unskilled prospective worker is limited in being able to "try out" for the job because the rules and regulations prevent the worker from operating a conventional heating oil tank truck. If the worker takes the initiative to become qualified prior to obtaining employment as a driver, the worker is faced with paying a commercial entity for training to earn a CDL, along with the time and cost of getting the required heating oil delivery related endorsements, etc. On the other hand, if a dealer hires an unskilled worker and pays the cost of the worker's seeking to get a CDL and other qualifications, etc., there is the risk that the worker either fails to meet the performance standards or loses interest in the job either during the learning process or shortly after becoming qualified. Therefore, there is a need for improvement that would benefit both worker and employer.

SUMMARY

An object of the present invention is to improve the capacity of fuel oil dealers to acquire drivers who are qualified to drive conventional heating oil tank trucks for making deliveries to their customers. A further object is to encourage comparatively unskilled workers to become familiar and partially skilled at least with heating oil delivery practices. Another still further object is to deliver heating oil to customers, particularly low-quantity-delivery customers, in an efficient and legitimate way.

In accord with the invention, a method of training and qualifying a worker to deliver home heating oil to fuel oil dealer customers comprises the fuel oil dealer providing a self-powered portable assembly carried on a first truck as removable cargo, where the assembly includes a heating oil tank that has a capacity of no more than about 119 gallons. The dealer than allows a trainee-worker to drive the first truck over public roads to deliver small quantities of heating oil to one or more customers. An embodiment of portable assembly has a NTEP certified meter subsystem and oil is delivered in weights and measures approved fashion, with pumping at the rate of 2 to 29 gallons per minute. Preferably, the first truck has a gross vehicle weight of less than 10,000 pounds said portable assembly when filled with about 119 gallons of oil has a weight of less than 1,500 pounds.

As the trainee-worker becomes adept at his/her job, and presuming the dealer/employer observes favorable performance, the worker may acquire a commercial driver license (CDL) with endorsements necessary for operation of a conventional heating oil tank truck, and thereafter the work will make large quantity deliveries to customers using such conventional tank truck.

The invention provides an innovative and economic way for a fuel oil dealer to acquire drivers who can become capable of operating conventional heating oil tank trucks. Good workers with conventional tank truck skills are often hard to find. The invention will enable employment of workers who otherwise might be deterred from entering the occupation of heating oil delivery due to the seeming high barriers to entry, namely, meeting the technical and regulatory requirements. A further advantage of the invention is saving of energy and operational costs.

The foregoing and other objects, features and advantages of the present invention will become more apparent from the following description of preferred embodiments and accompanying drawings.

DESCRIPTION

Figure 1:
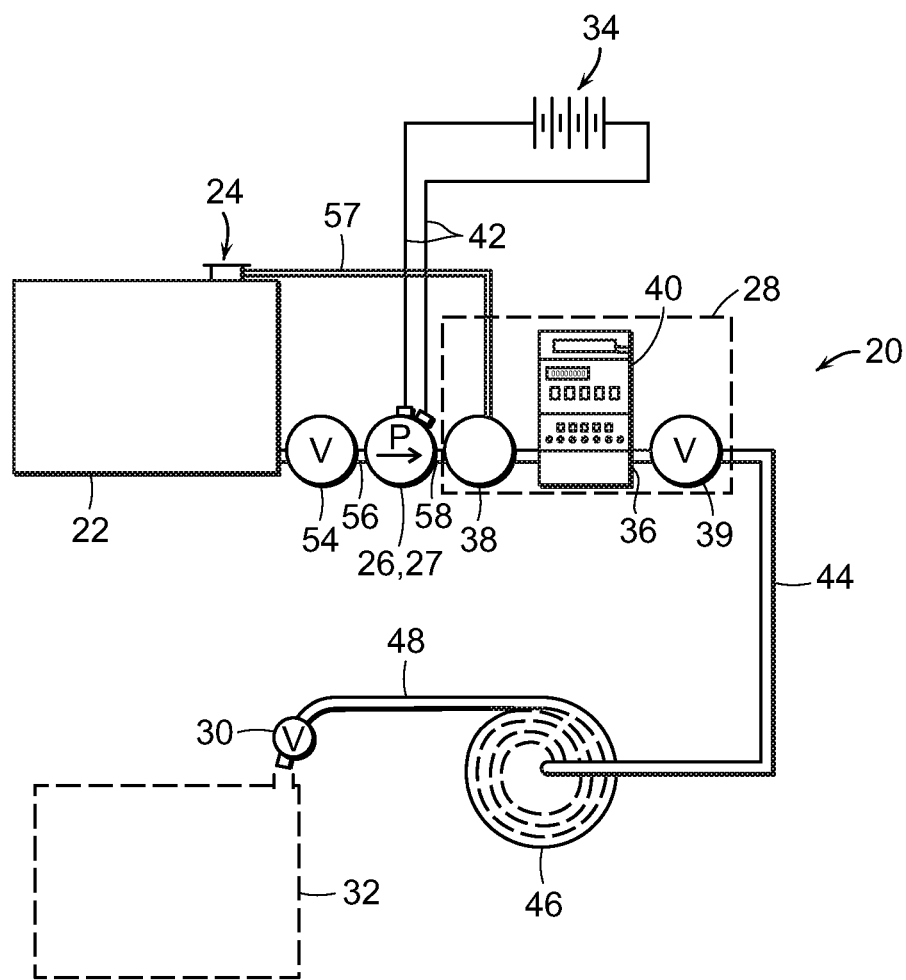
FIG. 1 is a schematic diagram of apparatus of the present invention.
Figure 2:
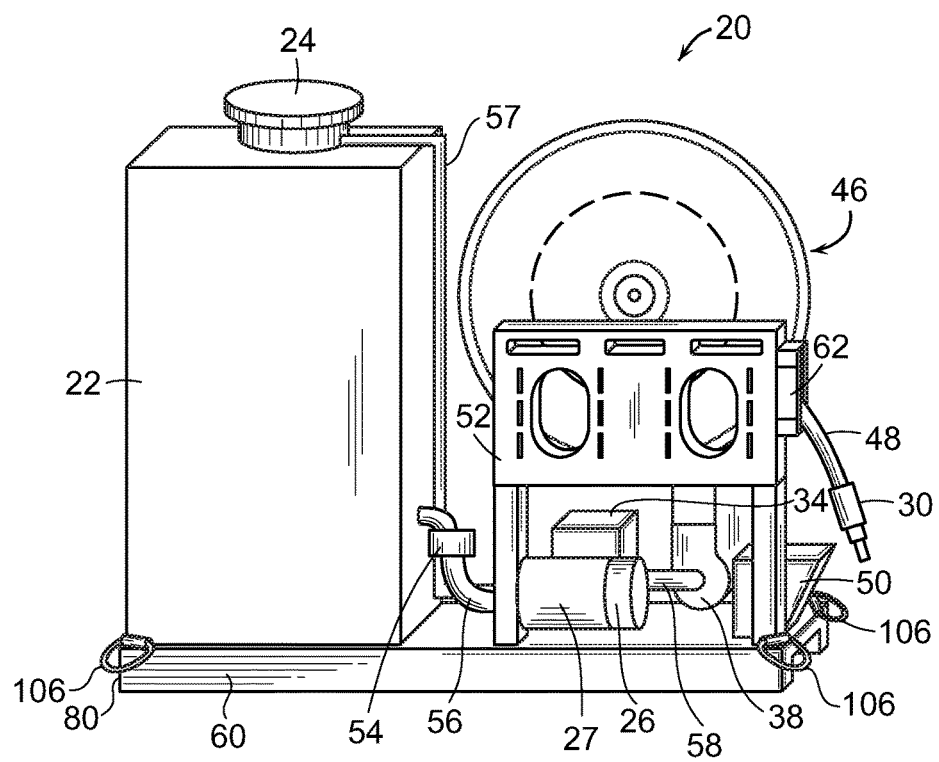
FIG. 2 is a side view of an embodiment of apparatus of the invention, including a skid.
Figure 3:
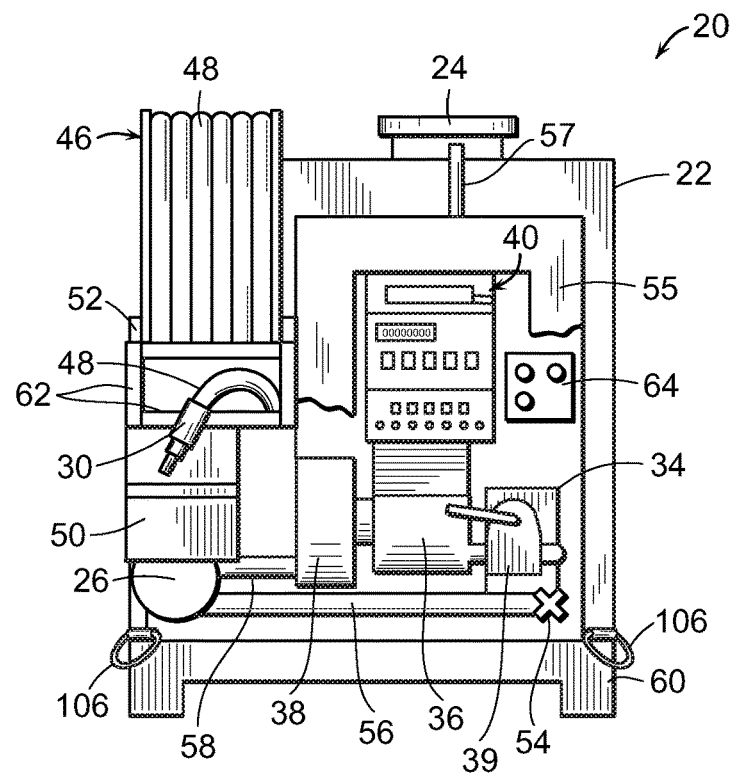
FIG. 3 is an end view of the apparatus in FIG. 2.
Figure 4:
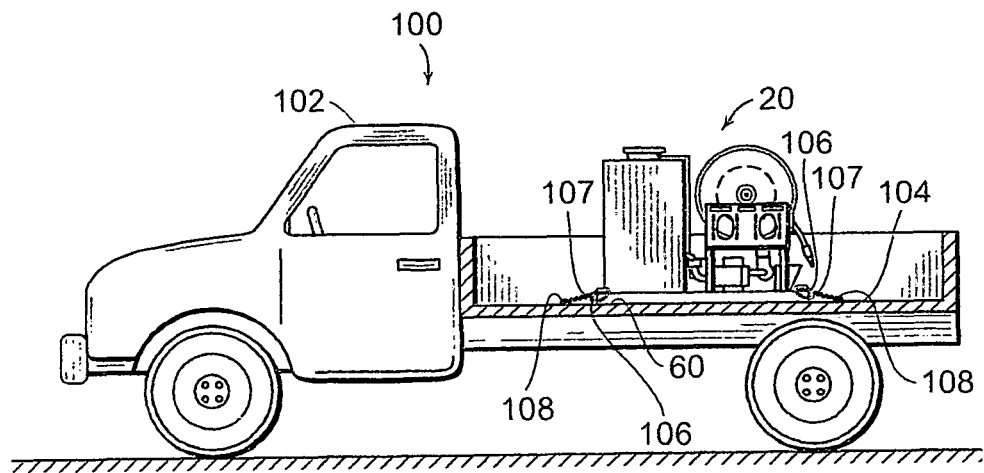
FIG. 4 is a side view of a pickup truck, with a portion of the truck bed cut-away, and the apparatus shown in FIG. 1 and FIG. 2 being carried on the bed.

The disclosures, including the specification and drawings in their entireties, of application Ser. No. 13/561,041, filed Jul. 29, 2012 and of application Ser. No. 15/264,137, filed Sep. 13, 2016 are hereby incorporated by reference. In the present invention, it is necessary to have apparatus for delivering home heating oil, which apparatus may be used by a worker who, while aspiring to be a driver of a conventional heating oil tank truck, does not have the qualifications, license, and endorsements necessary to operate such a truck, as they are described in the Background above. Such an apparatus is shown in FIGS. 1 to 3 and described below. In FIG. 4 the apparatus is shown as it is carried as skid-mounted removable cargo on a pickup truck.

Referring to the Figures, particularly FIG. 1, an embodiment of invention apparatus 20 is comprised of several elements. A compactly configured storage tank 22 having a hatch or filler port 24 is suited for carrying almost 119 gallons of heating oil. Pump 26 is driven by an integral motor 27, preferably a DC motor powered by electric lines 42 running from battery 34. Pump 26 draws oil from tank 22 through shut-off valve 54 and line 56; oil from the pump flows through line 58 to air eliminator 38, then through meter 36, then through preset quantity control valve 39.

Connected to the meter is register 40 which displays the oil quantity which has been pumped. Register 40 also includes an integral printer for producing a paper receipt or ticket.

The oil flows from the meter subsystem 28 through a pipeline 44 to hose reel 46 and then through hose 48 and nozzle valve 30 and into customer container 32, a tank shown in phantom in FIG. 1. Meter 36 is preferably of the piston-positive displacement type described below. The filler port 22 of tank 24 is preferably a so-called bulkhead fitting, familiar in heating and fuel oil industry. The bulkhead fitting is crafted to prevent the escape of vapors or liquid, but it allows air to enter the tank as heating oil is removed from the tank by the pump.

The meter subsystem comprises the combination of an air eliminator 38, a flow meter 36, a preset quantity control valve 39, and the data display and printing register 40. Air (and any vapor or droplets which might be carried in the air) is removed from the oil and is vented through pipe line 57 which runs from the air eliminator 38 to tank 22.

If delivery of a predetermined quantity of oil is desired, the truck driver programs the meter subsystem for the desired quantity, and mechanisms within the meter subsystem cause the preset control quantity valve 39 to close and stop oil flow when the predetermined quantity has passed through the meter.

As shown in FIG. 2 and FIG. 3 the free end of the hose runs through guide 62 which is of the fairlead roller type. To dispense heating oil, an operator pulls hose from the reel in an amount sufficient to reach a customer container 32. The operator manipulates nozzle valve 30 at the free end of the hose, to flow a desired quantity of oil into container 32, for example, into a customer's heating oil storage tank.

There may be other fittings and devices in the oil flow path of an invention apparatus. Generally stated, the pump is in fluid communication with the tank; the meter subsystem is in fluid communication with the pump, and the hose of other discharge conduit is in fluid communication with the meter subsystem.

Referring to FIG. 2 and FIG. 3, apparatus 20 is mounted on skid 60, so that it can be moved as a portable unit. For example, it can be set on the bed 104 of a pickup truck 100 having a driver cab 102, as shown in FIG. 4; and, it can be transferred easily from one vehicle to another or to the ground for stationary operation. Portability is an important feature, since if the apparatus is attached to truck 100 or another vehicle in permanent fashion, the vehicle could be designated a heating oil tank truck, thus invoking regulatory requirements. To prevent movement during operation of the truck along a roadway, apparatus 20 is typically secured at four points to the bed 104 of truck 100 by tie downs 107 which connect D-rings 106 at the four corners of skid 60 to fittings 108 on the truck bed. The tie downs may be straps, chains, binders, etc.

Tank 22 is preferably a welded steel planar-sided structure and is positioned at the rear end 80 of the skid 60, as shown. Tank 22 may have other shapes. Tank 22, or any substitutional multiplicity of smaller tanks, has a volume capacity of no more than 119 U.S. gallons, to avoid triggering application of laws, regulations and other requirements that attend larger tanks carried by trucks. The tank capacity may be less than 119 gallons, but an about 119 gallon tank is preferred because it minimizes the frequency with which a driver has to return to a supply source to refill the tank after making deliveries.

Hose reel 46 is a conventional commercially known unit that is power-assisted by a drive means (not shown) to aid reeling hose 48 back onto the reel when dispensing of heating oil has been completed. A hand-cranked reel may be alternatively used. Hose reel 46 is supported on stanchions 52 that extend upwardly from skid 60. In the generality of the invention, there is a dispensing conduit in fluid communication with the meter subsystem and that conduit may comprise, as alternative examples, a simple length of hose or pipe without any hose reel.

With reference to FIG. 3, control system housing 55 is also mounted on skid 60; it is shown with its bottom portion cut away. Housing 55 protects portions of the meter subsystem and contains control panel 64. The housing preferably has a lockable door (not shown). Control panel 64 comprises electric switches and protective devices for controlling operation of the pump, for energizing other electric parts of the system and a light, and so forth. A conveniently accessible extension of the handle of shut-off valve 54 runs to the rear of the apparatus where it is just above the skid top and underneath the meter subsystem.

Pump 26 which preferably has an integral direct current motor 27, is chosen for a flow capacity in the range of 2-22 gallons per minute (GPM). When used with an alternative AC motor the flow rate may be 2-29 GPM.

The combination of pump 26 and meter subsystem 28 are capable of accurately transferring and measuring small quantities of heating oil. For example, between 1 and 25 gallons can be transferred and accurately controlled and measured, and a ticket or other permanent record can be produced showing the quantity dispensed to the nearest one-tenth of a gallon. The comparative low flow rate of the pump of the invention apparatus makes it suited for filling small containers, such as a 5 gallon container. That contrasts with the large flow rate pumps characteristic of many large local-delivery heating oil tank trucks mentioned in the Background, for example one that is capable of flowing 40-110 GPM. Not only are those pumps poorly suited for pumping of small quantities, the meter subsystems of such tank trucks typically cannot be counted on to not provide accurate metering of less than 25 gallon quantities.

Apparatus 20 preferably includes skid 60 which is, for example, about a 40 inch by 48 inch rectangle of fabricated steel; it has a footprint small enough to fit on the bed of a common pickup truck. The term "skid" shall not be limiting and shall be construed as embracing any structure which functions as a base sufficient to carry the apparatus components and enable them to be moved as an integral unit while functionally interconnected. The tank, pump, and piping, control housing and skid are preferably constructed prevalently of iron alloy materials; alternative materials including aluminum and copper alloys may be used.

Apparatus 20 is constructed in a manner which economizes material and weight. Thus, when tank 22 is empty, an exemplary apparatus 20 which includes two storage batteries 34 may weigh about 500-600 pounds. When tank 22 is substantially filled (i.e., nearly 100% filled) with just under 119 gallons of heating oil, which weighs about 840-880 pounds (depending on oil density, which may vary between 7.05 and 7.4 pounds per gallon, and which typically is about 7.2 pounds per gallon). And the total weight of the heating oil-filled preferred apparatus is no more than 1,500 pounds, and thus within the capacity of a common commercial 1,500 pound load rating pickup truck or van (familiarly called a "three-quarter ton motor vehicle").

In an exemplary alternative embodiment, tank 22 has a capacity substantially less than 119 gallons, for example, about 70 gallons, and the total weight of the apparatus with a tank filled with oil is about 1,000 pounds, which is within the load capacity of a 1,000 pound load rating truck (familiarly called a "half-ton motor vehicle").

As is well-known, familiar half-ton and three quarter-ton capacity pickup trucks and vans typically have a gross vehicle weight rating of less than 10,000 pounds. That is well below the 26,001 pound threshold weight which requires a CDL and therefore a driver of a vehicle carrying the invention apparatus need only have a regular driver's license. No driver's license endorsements related to driving a large heating oil tank truck are required for such pickup trucks and vans when they are carrying the invention apparatus as removable cargo. And the vehicle carrying the invention apparatus does not have to be placarded, or to have a fire extinguisher, or to be otherwise treated like an ordinary large heating oil tank truck.

Alternatively, a trailer towed by a truck or automobile may be used to carry the invention apparatus like embodiment 20. In further alternatives, apparatus 20 or the like may be carried on a boat, barge, sled, airplane, helicopter, etc. In a still further alternative, the apparatus may be used in a stationary mode, that is, when it is not being carried by a vehicle.

In an alternate embodiment of the invention, an electrical motor driven pump 26 may be powered by other than storage batteries. For example, the pump may be powered by direct current electric system of the truck or other motor vehicle which is used to transport the apparatus, separately or in combination with a storage battery 34. A solar panel may also be used to recharge the battery. A fuel cell or an internal combustion engine powered generator may be used. In another alternative, AC power drawn from a private or public utility alternating current system may be used. In the generality of embodiments of the invention, the apparatus electric power source may be selected from the group comprising: an electric storage device mounted on the skid or separated from the skid, an electric generating device mounted on the skid or separated from the skid, a DC electric system of a motor vehicle, and an AC power system, or combinations of the foregoing.

In the generality of the invention, the meter subsystem includes means for acquiring and recording the quantity of heating oil delivered in weights and measures approved fashion, including in a way which meets the NTEP certification standard. A preferred and currently conventional way of providing a permanent record of an oil delivery is by means of a printer which produces a hard paper copy. In the scope of the claimed invention any reference to printing or printing a ticket shall embrace other means for outputting and recording data about the heating oil quantity delivered, including transmitting by wire or wirelessly information to a local or remote electronic storage or memory device.

As used herein, "residential storage tank" refers to a tank, typically of 275 to 330 gallons capacity, which is building-code approved for use inside or outside a residential dwelling. The term "residential" herein should not be considered limiting, since conventionally, the same name is applied to such kind of tank when it is used in a commercial building.

The invention apparatus as described is particularly designed and constructed for handling home heating oil (HHO), often also called No. 2 heating oil, and delivering it for heating purposes at residential, commercial, and other buildings. HHO conforms to ASTM standard D396 (ASTM International) and is described more above. As indicated in the Background, the distribution and sale of HHO is particularly regulated, in distinction to how other oil products, including diesel engine fuel oil, may be regulated.

An exemplary embodiment of the present invention has met the NTEP certification standard mentioned in the Background; namely, it will comply with the National Institutes of Standards and Technology requirements set forth in "NIST Handbook 44: Specifications, Tolerances, and Other Technical Requirements for Weighing and Measuring Devices" and will be subject to a Certificate of Conformance pursuant to the National Type Evaluation Program (NTEP certification) of the National Conference on Weights and Measures, Lincoln, Nebr. When the exemplary apparatus flowed oil at rates in the range of 2 to 24 GPM (for DC power supply) and 2-29 GPM (for AC power supply), it was in conformance with accuracy class 0.5*, as set forth in Handbook 44. That included an acceptance tolerance of 0.3 percent for certain heating oil quantities in amounts of 50 gallons or less. An exemplary apparatus 20 of applicant was issued a National Type Evaluation Program Certificate of Conformance (No. 11-112) by the National Conference on Weights and Measures and that is marked on various commercial embodiments of the apparatus.

Thus, a commercial embodiment of the invention apparatus meets heating oil dealer needs by being weights and measures approved; and since the tank capacity is less than 119 gallons, and since the apparatus is carried as skid-mounted cargo when on a pickup truck or the like, there is no requirement to display placards and meet various other costly heating oil tank truck related standards mentioned above.

An exemplary meter subsystem comprises a Murray brand 1½ inch pipe diameter size petroleum meter Model TMS 682, having an air eliminator accessory, a strainer, a display register, a ticket printer and a pre-settable volume control valve (Murray Equipment Inc., Fort Wayne, Ind.). The pre-settable volume control valve enables a delivery man to input a desired quantity of fuel, e.g. 20 gallons, and the pre-settable control valve will automatically close and stop the flow of heating oil when that quantity has flowed through the meter. Other commercial meter subsystem units or other combinations of devices may be used to carry out the functions of meter subsystem provided the resultant combination meets NTEP certification standards.

An exemplary pump 26 is a Model 489G-95, sub-code 1011 pump (American Machine Tool. Co., Inc. Royersford, Pa.). Other commercial pumps of comparable function may be used.

The present invention includes a new and different way of delivering liquid petroleum heating oil to residential and commercial customers. The invention enables a dealer to periodically deliver to a customer a small quantity of heating oil, such as 1, 5, 25 gallons, and up to almost 119 gallons, in an economic manner, while meeting regulatory requirements with respect to metering and ticketing, and while conforming with motor vehicle laws and regulations. That compares with using the kind of large local-delivery heating oil tank truck which has a capacity of more than 1,000 gallons, typically 2,800-5,000 gallons, as described in the Background, and which has a pump and meter subsystem that are geared toward delivering 25 gallons or more in a high flow rate manner, which truck is not suited for delivering less-than-25 gallon quantities.

A method of the present invention comprises providing an apparatus for pumping and metering and ticketing home heating oil, which apparatus complies with the NTEP certification standard. Exemplary apparatus comprises a heating oil tank having a capacity of about 119 U.S. gallons or less. The method further includes: transporting the apparatus as removable cargo on a motor vehicle having a gross vehicle weight of less than 26,001 pounds to the point of dispensing heating oil; flowing heating oil through the apparatus by means of an electric powered pump at a rate of 2 to 29 GPM for a total delivery quantity of between 1 and 25 gallons, alternately up to just under 119 gallons; and preferably delivering said quantity of heating oil to a customer's heating oil storage tank, such as are commonly associated with a dwelling, commercial building or other building, where the tank has a capacity of more than 250 gallons, typically 275 gallons or 330 gallons.

Thus, in an embodiment of the invention, a heating oil dealer may have a driver who is qualified deliver to a particular customer oil in quantities of more than 25 gallons, typically 100-200 gallons, during the season of high daily consumption, such as during the winter time using a placarded tank truck of more than 1,000 gallons capacity, typically 2,800 to 5,000 gallons, maybe having a gross vehicle weight of more than 26,001 pounds. When a tank truck carries 1,000 gallons more of heating oil, the oil will weigh more than 7,000 pounds and the tank truck with the oil will weigh very much more than 10,000 pounds.

In coordination, the same heating oil dealer can have a driver deliver oil at another time to the same particular customer (or to other customers) in quantities in the range 1 to 5 to 25 gallons, up to about 119 gallons. When the smaller quantity delivery is made, the dealer will use the portable skid-mounted apparatus of the present invention, as described herein, in combination with a truck or equivalent vehicle which has a gross vehicle weight of less than 26,0001 pounds, more preferably less than 10,000 pounds. The vehicle used for the small-quantity delivery is driven without placards along public roads by a non-CDL qualified driver or by a CDL driver lacking one or more of the required heating oil tank truck related endorsements. The smaller quantity delivery is made in a way which complies with motor vehicle, transport, environmental and tax laws. The truck will carry less than 119 gallons of home heating oil and the weight of such oil will be no more than about 880 pounds (based on the oil weighing 7.4 pounds per gallon).

In use of apparatus 20 when carried as cargo on a small truck or the like to deliver oil to the customer storage tank or other container, the worker will drive the small truck to the customer's location and to proximity of the customer heating oil storage tank. With reference again to FIGS. 1 to 4, the worker will open the heating oil tank shut-off valve 54 of apparatus 20; actuate a master power switch on the electric panel 64 to provide electric power to the pump motor 27 and to any hose reel driver (and to the meter subsystem if such should be electronic); insert a blank heating oil delivery ticket receipt into the display and ticket 40 of meter subsystem 28; input to the preset volume control valve portion of meter subsystem the desired gallon quantity of heating oil to be delivered, if a predetermined quantity is to be delivered; actuate the flow valve lever (not shown) of the meter subsystem; remove the nozzle-valve 30 of the hose 48 from its resting place at drip pan 50 and carry it to the fill pipe or opening of the customer tank or container 32. Hose 48 is pulled as needed from the reel 46. Then, the heating oil delivery valve 30 at the hose nozzle is opened. When discharge of the predetermined heating oil quantity is reached, meter subsystem 28 will automatically stop the flow of heating oil based on the predetermined quantity which the delivery man had programmed into the system. Alternatively, valve 30 is closed by the delivery man to cease flow based on the amount in the customer's heating oil storage tank or container. The hose with closed valve 30 is then returned to the drip pan 50 (or other resting place) and the hose 48 is retracted onto reel 46 with the aid of the motor (not shown) which powers the reel, or by means of a substitute hand crank. Valve 54 is closed and power to the pump motor and the control system is deactivated. A record of the delivery, namely a ticket receipt printed by the meter subsystem, is given to the customer and or taken back to the dealer's shop. Alternatively, the quantity delivered is electronically recorded or wirelessly transmitted to an electromagnetic or optical storage device.

Use of the invention apparatus also enables a new way of training and qualifying a worker in the art of delivery of home heating oil to one or more residential or commercial heating oil storage tanks at delivery points of a multiplicity of customers within a fuel oil dealer customer group, as follows.

In an embodiment of this aspect of the invention, a worker has an ordinary driver license but no tank truck driving or heating oil delivery skills. Alternatively stated, the worker lacks qualifications. The worker is hired and, after being given instruction about safety and hazards, the worker is tasked to deliver heating oil in a correct and legal way by driving a vehicle having a less than 10,000 pound gross vehicle weight, upon which is carried as cargo the present portable invention integral assembly which includes tank, pump, meter, hose reel, etc. as detailed above. If such worker does not like the working conditions or does not do a good job, the worker either quits or is discharged. A worker who likes the work and does a good job can give the dealer-employer confidence, to the point that the dealer-employer even might feel that it is appropriate to pay part or all of the cost for the worker to become qualified as a driver of a conventional heating oil delivery tank truck (i.e., by gaining a CDL, the necessary skills, and the requisite endorsements). If and when such a worker becomes qualified, a dealer-employer will have acquired a known-to-be-good-worker as a driver for the dealer's conventional tank trucks. And a worker presumably benefits by having become better qualified and able to seek higher pay from the dealer, or employment in the future with other dealers.

Workers who are not well skilled in the art of heating oil delivery can thus be trained at the dealer workplace and in the field using an exemplary apparatus 20 and other embodiments thereof. Workers might first be made familiar with such as an exemplary portable assembly 20 and its operation when the assembly is located in an environment more conducive to learning than is a in-the-field situation; for instance, when the apparatus is set on a floor, bench, or wagon which is inside a dealer garage, or even within a class-room-like environment. An exemplary apparatus might even be transported in a commercial building elevator.

Figure 5:
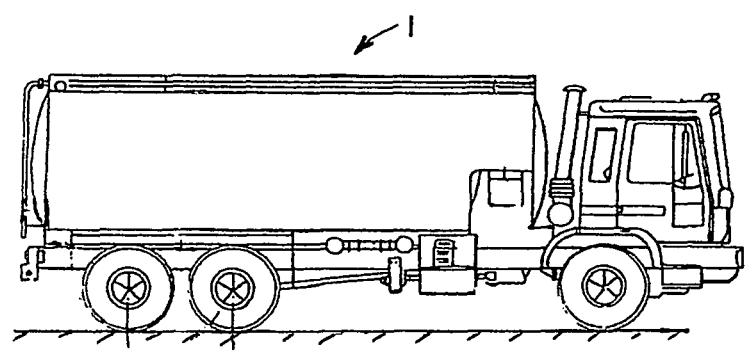
FIG. 5 shows a conventional heating oil tank truck, as known in the prior art.

Using invention apparatus and methods, unskilled workers can acquire experience in actually making heating oil deliveries, without having to meet the multiple demanding conventional-tank-truck-related requirements which are mentioned above. The comparatively low flow rate and the small quantities involved with the portable assembly will tend to mitigate the consequences of any driver mistake. The activities of the worker will be monitored and assessed by the fuel oil dealer or an employee, and a judgment may be reached about the worker. Such monitoring may include direct observation in the field, checking with customers or checking out reports by customers and others, etc. When a worker demonstrates capability and adaptation for the job of delivering heating oil, then the worker may seek to further expand his/her capacity by seeking a CDL and seeking the other endorsements and qualifications that are required for driving a conventional heating oil tank truck, with or without financial and other participation by the heating oil dealer. A conventional heating oil tank truck is shown in FIG. 5.

Good workers with conventional tank truck skills are often hard to find. The invention enables a heating oil dealer to attract workers who otherwise might be deterred from entering the occupation of heating oil delivery due to the seeming high barriers to entry, namely, meeting the financial, technical and regulatory requirements.

A further advantage of the invention is saving of energy and operational costs. Compared to using a conventional tank truck, energy and cost are reduced when a pickup truck carrying an exemplary apparatus as cargo is used: There are inherently lower fuel consumption and maintenance costs attending the smaller truck. And when the pump of the portable system is battery powered the truck engine does not need to be kept running.

Another further advantage of the invention is that workers or managers who are not qualified to drive a conventional tank truck can supplement the work of drivers having CDL with endorsements, etc. when those qualified drivers and trucks are not available. So, for example, in emergency or other urgent situations, a worker/manager can deliver heating oil by driving a pickup truck carrying the portable invention apparatus as cargo.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method wherein heating oil dealer trains and qualifies a worker to use a heating oil tank truck having a tank capacity of more than 1,000 gallons and having a gross vehicle weight capacity of at least 26,001 pounds to carry out deliveries of heating oil to heating oil storage tanks at delivery points of customers within a residential or commercial customer group of the heating oil dealer, and wherein the worker carries out said deliveries, which comprises the steps of:
    (a) said heating oil dealer providing a first truck having a gross vehicle weight of less than 10,000 pounds and a portable assembly comprised of a heating oil tank, an electric powered pump connected to the tank, a meter subsystem meeting NTEP certification requirements in fluid communication with the pump, and a dispensing conduit in fluid communication with the meter subsystem, wherein the tank has a capacity of no more than about 119 gallons and wherein the tank contains said heating oil; wherein the portable assembly is carried on said first truck as removable cargo;
    (b) the worker, without having a commercial driver license with necessary endorsements including a hazardous material endorsement that is required for driving on a public road a heating oil tank truck having a tank capacity of more than 1,000 gallons and having a gross vehicle weight capacity of at least 26,001 pounds, then driving the first truck over public roads to one or more of said delivery points;
    (c) when at each said one or more of said delivery points, the worker then turning on the electric pump of said portable assembly, and causing flow of said heating oil from the tank of the portable assembly to and through the meter subsystem and to and through the dispensing conduit thereof, to thereby flow a quantity of said heating oil which is between 1 and 119 gallons into said residential or commercial heating oil storage tanks at said delivery points, wherein the flow rate of said heating oil is between 2 and 29 gallons per minute; and wherein said meter subsystem measures the quantity of said heating oil as said heating oil is being flowed through said meter subsystem of the portable assembly in a NTEP certification weights and measures approved fashion;
    (d) wherein after repeating steps (b) and (c) a multiplicity of times, the worker then obtains a commercial driver license with endorsements necessary for operation of a heating oil tank truck having a tank with a capacity of more than 1,000 gallons and having a gross vehicle weight capacity of 26,001 pounds or more;
    (e) the heating oil dealer then providing a second truck having a having a gross vehicle weight capacity of 26,001 pounds or more, a permanently attached heating oil tank with a capacity of more than 1,000 gallons and containing more than 120 gallons of heating oil, a pump for pumping said heating oil from said second truck tank to a residential or commercial heating oil storage tank, and a meter subsystem for metering said heating oil pumped from the second truck tank;
    (f) the worker then driving the second truck along said public roads to said one or more of said delivery points; and,
    (g) when at each said one or more of said delivery points, the worker then flowing more than 120 gallons of said heating oil into said residential or commercial heating oil storage tanks at a rate of more than 40 gallons per minute, from the heating oil tank of said second truck.

2. The method of claim 1 wherein, in step (a) said portable assembly, when filled with 119 gallons of said heating oil, has a weight of less than 1,500 pounds.

3. The method of claim 1 which further comprises: the heating oil dealer monitoring performance of the worker in carrying out steps (b) and (c).

4. The method of claim 1 further comprising the steps of
    (h) the heating oil dealer or the worker removing the portable assembly from the first truck after carrying out steps (a) through (c); and
    (i) then re-loading the portable assembly as said removable cargo on the first truck.

5. A method of training and qualifying a worker to use a heating oil tank truck having a tank with a capacity of more than 1,000 gallons and having a gross vehicle weight capacity of at least 26,001 pounds to carry out deliveries of heating oil to heating oil storage tanks at delivery points of a multiplicity of customers within a residential and/or commercial customer group of a heating oil dealer, and wherein the worker carries out said deliveries, which comprises the steps of:
    (a) said heating oil dealer providing a first truck and portable assembly comprised of a heating oil tank, an electric powered pump connected to the tank, a meter subsystem meeting NTEP certification requirements in fluid communication with the pump, and a dispensing conduit in fluid communication with the meter subsystem, wherein the tank has a capacity of no more than about 119 gallons and wherein the tank contains said heating oil; wherein the portable assembly is carried on said first truck as removable cargo, wherein the first truck has a gross vehicle weight of less than 10,000 pounds and wherein said portable assembly when filled with 119 gallons of oil has a weight of less than 1,500 pounds;

(b) the worker, without having a commercial driver license with necessary endorsements including a hazardous material endorsement that is required for driving on public roads a heating oil tank truck having a tank capacity of more than 1,000 gallons and having a gross vehicle weight capacity of at least 26,001 pounds, then driving the first truck over public roads to said delivery points;

(c) when at one or more of said delivery points, the worker turning on the electric pump of said portable assembly, and causing flow of said heating oil from the tank of the portable assembly to and through the meter subsystem and to and through the dispensing conduit thereof, to thereby flow a quantity of said heating oil which is between 1 and 119 gallons into a residential or commercial storage tank at said delivery points, wherein the heating oil flow rate is between 2 and 29 gallons per minute; and wherein the portable assembly measures the quantity of said heating oil as said heating oil is being flowed through the NTEP certified meter subsystem of the portable assembly in a NTEP certification weights and measures approved fashion;

(d) wherein, after repeating steps (b) and (c) a multiplicity of times, the worker then obtains a commercial driver license with endorsements necessary for operation of a heating oil tank truck having a tank with a capacity of more than 1,000 gallons and containing more than 120 gallons of said heating oil, the heating oil tank truck having a gross vehicle weight capacity of 26,001 pounds or more;

(e) the heating oil dealer then providing a second truck having a permanently attached heating oil tank with a capacity of more than 1,000 gallons and containing more than 120 gallons of heating oil, a pump for pumping said heating oil from said second truck tank to a residential or commercial heating oil storage tank, and a meter subsystem for metering said heating oil as said heating oil is pumped from the second truck tank, wherein the second truck having has a gross vehicle weight capacity of 26,001 pounds or more;

(f) the worker then driving the second truck along said public roads to one or more of said delivery points; and, (g) when at said one or more delivery points, the worker flows more than 120 gallons of said heating oil from the heating oil tank of said second truck into said residential or commercial heating oil storage tank at a rate of more than 40 gallons per minute.

6. The method of claim 5 further comprising the step of the heating oil dealer or the worker removing the portable assembly from the first truck after carrying out steps (a) through (c) and then reloading the portable assembly on the first truck as removable cargo.

\* \* \* \* \*